June 17, 1969     J. A. SHAFER     3,450,063

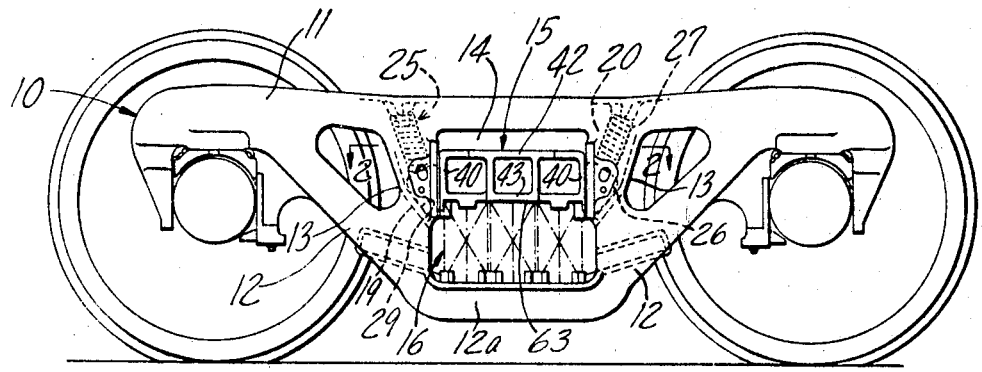

FRICTION DAMPENED RAILWAY TRUCK BOLSTER

Filed April 27, 1967

INVENTOR
JAMES A. SHAFER
BY Henry K Zak
ATTORNEY

United States Patent Office 3,450,063
Patented June 17, 1969

3,450,063
FRICTION DAMPENED RAILWAY TRUCK BOLSTER
James A. Shafer, East Cleveland, Ohio, assignor to Midland-Ross Corporation
Filed Apr. 27, 1967, Ser. No. 634,317
Int. Cl. B61f 5/04
U.S. Cl. 105—197      12 Claims

ABSTRACT OF THE DISCLOSURE

A snubbed-bolster railway car truck having a trapezoidal-shaped friction wear plate that is removably connected to the side of the bolster facing an opposed column of the side frame of the truck.

BACKGROUND OF THE INVENTION

One of the major problems confronting the railroad industry in general is the high cost of equipment maintenance; and one of the most troublesome maintenance problems in connection with car trucks is the rewelding of the fixed type of bolster wear plate to the side wall of the bolster.

Prior to the development of welding, a locking mechanism, such as a nut and bolt arrangement, was used to hold a friction wear plate in position. However the use of such securing devices was found to be disadvantageous since the plate would become loose as a result of the shocks and vibrations encountered during road service. Such a loosening of the plate eventually resulted in adverse wear conditions occurring between the snubbing mechanism and bolster.

As the technique of welding developed, wear plates were welded into position in an attempt to avoid the above problem. It has been found, however, that an unskilled welder, through human error, often formed a weld of poor quality, which eventually contributed to a weld failure. The herein disclosed invention provides a unique yet simple means to eliminate the welding of the plate to the side of the bolster in a car truck having a built-in friction system for controlling bolster movements. The invention resides in providing in such a car truck a bolster with a removable wear plate which is self-adjusted and which will not accidentally detach from the bolster while in use.

It is therefore the primary object of this invention to provide a railway car truck bolster with a wear plate that is removably secured within a recess in the side of the bolster.

Another object of the invention is to provide a car truck bolster having a removable wear plate that is interlocked to the bolster when the bolster is in assembled relation with the side frames of the car truck.

SUMMARY OF THE INVENTION

In brief, the invention comprises a removable wear plate for a car truck bolster that is used at the sides of a bolster and forms a part of the snubbing mechanism associated with the opposed side frame columns. One side of the wear plate is in contact with the snubbing mechanism while its other side is in opposed relation to a side of the bolster. The plate has bi-converging wedge faces at its ends. The bolster is recessed at its side to receive the plate, the ends of the recess being formed with wedge faces complemental to the wedge faces on the plate for engagement therewith. When the plate is assembled in the bolster recess with the aforementioned wedge faces in contact, it is disposed in spaced relationship to the side wall of the bolster, thereby allowing the plate to adjust relative to the bolster and the associated friction mechanism.

DESCRIPTION OF THE DRAWINGS

In the drawings, with respect to which the invention is described below:

FIG. 1 is a side elevation of a raliway car truck in accordance with the invention;

FIG. 2 is an enlarged fragmentary plan view, partly in section taken along line 2—2 of FIG. 1;

FIG. 3 is a fragmentary side elevation of the bolster shown in FIGS. 1 and 2;

FIG. 4 is a fragmentary bottom view of the bolster shown in FIGS. 1 and 2;

FIG. 5 is a perspective view of a removable friction wear plate employed in the car truck illustrated in FIG. 1;

DESCRIPTION OF THE EMBODIMENTS

Figure 7:
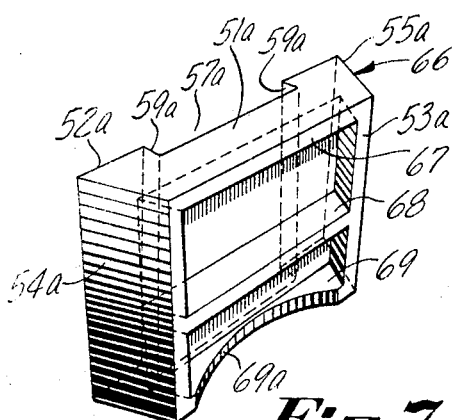
FIG. 7 is a perspective view of a removable friction wear plate in accordance with another embodiment of the invention.

Referring now to FIGS. 1 through 6 of the drawing, 10 indicates one of two side frame members of a railway car truck. Frame 10 has compression and tension members 11 and 12, respectively, that are connected by spaced vertical columns 13—13 to form therebetween a bolster-receiving opening 14. A bolster 15 has its opposite ends received in opening 14, in guided relation between columns 13—13 of each side frame. The bolster is supported on springs 16 which rest on the central portion 12a of the tension member of each side frame in the usual manner.

Each column 13 comprises inboard and outboard vertical side walls 17, 18, respectively. The side walls are structurally joined by a sloping transverse wall 19 to define a pocket 20 in communication with the bolster opening 14. Housed within the pocket is a friction unit 25 for damping the vertical and lateral movements of bolster 14 and springs 16. The friction unit comprises a wedge 26 and a spring 27. Although the friction unit is of the conventional type, it is to be understood that any suitable friction unit may be utilized in practicing the invention. Wedge 26 has a diagonal face 28 which bears against an upwardly facing surface 29 on transverse wall 19. The wedge provides frictional control of the bolster movements through the action of its vertical face 30 against the side of the bolster. The wedge acts against the bolster through a novel wear plate 35 which is associated with bolster 15, as will be described hereinafter. In the operation of the friction unit, spring 27 urges wedge 26 downwardly into engagement with plate 35 and wall 19.

Each column wall 17 and 18 adjacent to bolster opening 14 is provided with a vertical flange 36 that extends laterally outwardly from its respective wall. Flanges 36 in conjunction with side walls 17 and 18 provide substantially planate bolster guide faces 37. Faces 37 are co-planar and are adapted to engage in guiding relationship the opposing surfaces provided on the bolster.

The bolster 15 is of generally box-shape construction at each end and comprises spaced side walls 40, 40 having vertically disposed faces 41, 41. Side walls 40 are joined with top and bottom walls 42 and 43, respectively. Associated with each side wall 40 is a pair of laterally spaced, vertically extending guide lugs 45, 45. Each lug 45 is provided with a guide surface 46 which is adapted to engage the opposing column guide face 37 to limit movement of the bolster in a direction longitudinally of the side frame. In addition, each pair of lugs 45 is provided with opposed bi-directional planar surfaces 48, 48 that converge both downwardly and inwardly. Surfaces 48 in combination with face 41 define a wear plate receiving recess 49 having a trapezoidal configuration.

Disposed within each recess 49 in spaced relation to face 41 and in wedging relation with surfaces 48, 48 is the aforementioned wear plate 35. Wear plate 35 is in the form of a trapezoidal plate section 51 having front and rear vertical surfaces 52 and 53, respectively. The ends of the plate are provided with bi-converging wedge faces 54 and 55. Faces 54 and 55 converge in a downward direction and also converge from the front surface 52 toward the rear surface 53 of the plate. Faces 54 and 55 are complementally sloped relative to surfaces 48 in recess 49 of the bolster and are adapted to engage therewith upon application of the plate into the recess.

The front side of the plate is recessed vertically as at 57 to provide a pair of extensions 58 having opposed vertical guide faces 59. In the assembled position of the plate within recess 49, surface 52 of the plate is flush with the adjacent surfaces 46 on the bolster. It is to be noted that recess 57 receives a portion of the friction wedge 26, with guide faces 59 overlapping the sides of the wedge to interlock the bolster with the side frame.

Figure 6:
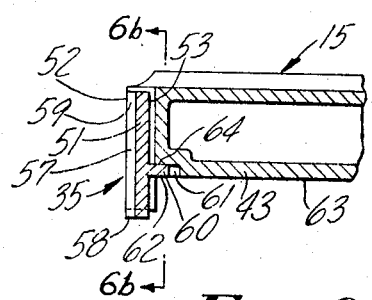
FIG. 6 is an enlarged vertical sectional view of the bolster taken along line 6—6 of FIG. 4.

To prevent the upward displacement of the plate 35 from its assembled position within the recess 49 of the bolster, the plate is provided on its rearward side with a horizontal shelf or ledge 60 adapted to underlie a portion of the bolster. As illustrated in FIGS. 4 and 6, ledge 60 is received within a horizontal recess 61 provided in the bottom wall 43 of bolster 15. Recess 61 has a vertical dimension equal to the thickness of the ledge so that the downwardly facing surface 62 of the ledge is contained in the plane of the bolster spring seat 63. Thus, plate 35 is held against upward movement by the engagement of the upwardly facing surface 64 of the ledge with the bottom wall of the bolster. To further help maintain the plate in its normal operating position, a portion of the downwardly facing surface 62 of the ledge serves as a partial spring seat 65 for at least one of the bolster supporting springs 16. Thus ledge 60 is urged upwardly by the spring into tight abutting relation with the bottom of the bolster to resist any outward and downward movement of the plate relative to the bolster. It will be apparent that the wedging engagement between downwardly converging surfaces 48 on the bolster and the complemental faces 54 and 55 on the plate hold the latter against downward movement relative to the bolster. Thus, plate 35 is effectively secured to the side of the bolster for movement therewith as an integral part thereof during vertical as well as lateral movement of the bolster.

In the assembly of the car truck, a friction spring 27 and wedge 26 are inserted into each pocket 20 of the side frame, with each shoe being urged upwardly into the pocket and then pinned in a retracted position. A wear plate 35 is thne inserted into each of the recesses 49, with the ledge 60 of each plate positioned in the horizontal recess 61 and the wedge faces 54 and 55 engaging the complementary surfaces on the bolster. The wear plates are held loosely in their associated recesses by any means, such as an inverted U-shaped clamp which slips over the top wall 42, with the ends of the clamp engaging the front surfaces 52 of the plates to thereby hold the plates in position. The ends of the bolster are then inserted into the bolster openings of the side frames and positioned upon the supporting springs 16. Thereafter the U-shaped clamp is removed and each shoe placed in an operative position with its vertical face 30 engaging the front vertical surface of the opposed wear plate to maintain the plate in the recess by the pressure of the shoe acting against the plate and thereby establishing the interlock between the bolster and the side frame.

Figure 8:
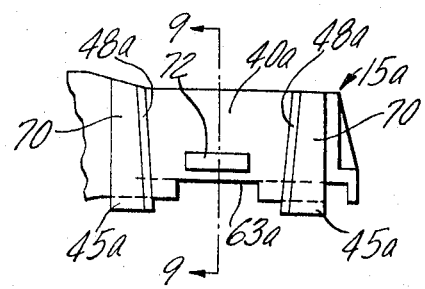
FIG. 8 is a fragmentary side elevation of a bolster modified to accommodate the wear plate illustrated in FIG. 7.
Figure 9:
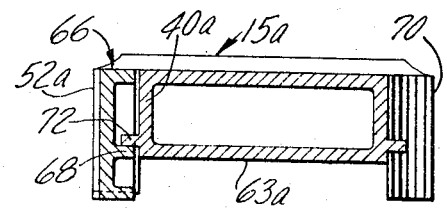
FIG. 9 is a transverse vertical sectional view of the bolster taken along line 9—9 of FIG. 8.
Figure 6A:
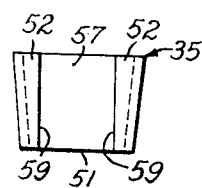
FIGS. 6a and 6b are front and rear elevations of the wear plate taken along lines 6a—6a and 6b—6b of FIGS. 4 and 6, respectively.
Figure 6B:
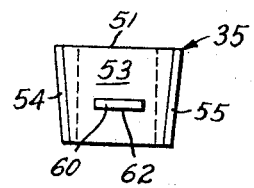

FIGS. 7, 8 and 9 illustrate a modification of the invention wherein the ends of a wear plate 66 are provided with a greater bearing area for engagement with the complementary surfaces of the bolster. Modified wear plate 66 is of greater thickness than the plate of the preceding embodiment and comprises the trapezoidal plate section 51a which is recessed on both sides thereof. The front face 52a is recessed vertically as at 57a to provide vertical guide faces 59a for engagement with the friction wedge, as in the previous embodiment. The rear face 53a is recessed to provide horizontal reinforcing ribs 67, 68 and 69. The ends of the plate 66, as before, are provided with bi-converging wedge faces 54a and 55a which are of larger area than surfaces 54 and 55 of the plate shown in FIG. 5.

To accommodate plate 66 in the side of bolster 15a, the bolster side wall 40a is recessed sufficiently between guide lugs 45a so that when the plate is applied into that recess, its front face 52a is flush with the guide surfaces 70. It is to be understood that the ends of the recess in bolster 15a are formed with surfaces 48a which are complemental to and are engaged by wedge faces 54a and 55a.

Plate 66 is held against upward movement relative to the bolster by means of rib 68 in the same manner as afforded by ledge 60 of the plate in the previous embodiment. In this connection the bolster is provided with an integral shelf 72 which is adapted for engagement with the top side of rib 68. The underside of rib 68 is in line with the underside 63a of the bolster so that the top of at least one of the bolster supporting springs bears against the rib to hold the plate securely in place. To permit one of the springs to bear against rib 68, rib 69 is arcuately shaped, as at 69a, so as to receive the adjacent bolster spring.

It will be understood that plate 66 functions as the side of the bolster 15a in the same manner as plate 35 of the previous embodiment.

Figure 10:
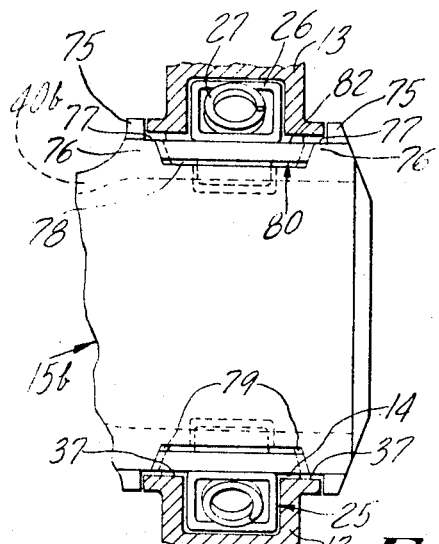
FIG. 10 is a fragmentary plan view in accordance with a further embodiment of the invention.

FIG. 10 illustrates another embodiment of the invention wherein the bolster 15b is interlocked with the side frame columns 13 by means of the usual bolster gibs. Thus, at each side of the bolster, there is a pair of vertically extending bolster gibs 75, 75 that overlap the sides of the adjacent column 13 in a direction longitudinally of the side frame to retain the end of the bolster within the bolster opening against separation transversely of the side frame.

Each gib 75 is an extension of a guide lug 76 which is disposed on the side wall of the bolster in a manner similar to the lug 45 disposed on the bolster side wall 40 illustrated in FIG. 2. Between each pair of gibs 75, 75, there is provided on each lug 76, adjacent to gib 75, a vertical guide surface 77. Each guide surface 77 is in vertical guide surface 77. Each guide surface 77 is in spaced, approximately opposed relation with the vertical face 37 of the adjacent column 13. Recessed into each bolster side wall 40b centrally of lugs 76, 76 and guide surfaces 77, 77 is a vertically extending recess 78 having opposed bi-directional planar surfaces 79, 79 that converge both downwardly and inwardly of the bolster in the same manner as surfaces 48 and 48a of the previous embodiments. Disposed within recess 78 in engagement with surfaces 79, 79 is a friction wear plate 80. Wear plate 80 is similar to plate 35 except that its vertical friction face 82, which is provided for engagement with wedge 26, is not recessed to receive the wedge as in the previous embodiments. In this embodiment the wedge does not tie the bolster to the side frame, the interlock being accomplished by the aforementioned gibs. However, plate 80 is removably secured to the bolster side in the same manner as plate 35 of the preferred embodiment.

The invention as described hereinabove eliminates the present practice of welding wear plates to the sides of a bolster in a railway car truck and the many problems associated therewith.

The terms and expressions which have been employed are used as terms of description and not of limitation and there is no intention of excluding such equivalents of the invention described or portions thereof as fall within the claims.

What is claimed is:
1. A railway car truck comprising:
   (A) a side frame including vertical columns spcaed apart longitudinally of said frame and defining the opposite sides of a bolster-receiving opening, each of said columns having inboard and outboard side walls;
   (B) a bolster end movable in said opening and having its sides facing said columns;
   (C) resilient means supporting said bolster end on said frame;
   (D) each bolster side having a pair of vertical lugs spaced apart transversely of said frame, and facing the adjacent one of said columns, each pair of lugs having opposed bi-directional sloping planar surfaces, said planar surfaces and the bolster side defining a recess therebetween having a trapezoidal configuration tapering downwardly and inwardly;
   (E) a friction wear plate disposed in said recess and having complemental faces engaging said planar surfaces, said plate being interlocked with said bolster end against vertical movement relative thereto; and
   (F) snubbing means carried by said frame between said column side walls and comprising a friction member cooperating with said wear plate.
2. The car truck of claim 1 wherein:
   (A) the interlocking relationship between said plate and bolster end comprises a ledge on said plate having a surface thereon engageable with an opposing surface on said bolster.
3. The car truck of claim 1 wherein:
   (A) a pair of vertical guide members extend laterally outwardly from the sides of each column in the general vertical plane defined by the periphery of said opening; and
   (B) each of said lugs have a vertical guide surface in opposed relation with portions of said adjacent guide member to limit the transverse movement of the bolster end lengthwise of the frame.
4. The car truck of claim 3 wherein:
   (A) a gib projects outwardly from each lug on each side of the bolster into flanking relation with said guide members of the adjacent column to restrict the lateral movement of the bolster relative to the frame.
5. The car truck of claim 1 wherein:
   (A) said wear plate has a front vertical friction surface facing the opposing column, a rear surface facing the bolster side, and oppositely facing bi-converging end faces joining said front and rear surface; said rear surface and bolster side having a clearance therebetween to thereby allow the end faces of the plate to fully engage the planar surfaces of the bolster lugs.
6. The car truck of claim 5 wherein:
   (A) said wear plate has a pair of extensions projecting equidistantly away from said friction surface adjacent the bi-converging end faces to form a continuation of said end faces, said extensions defining a vertical recess therebetween to receive said friction member thereby enabling overlapping portions of the extensions and friction member to interlock the bolster with said side frame.
7. A removable bolster wear plate comprising:
   (A) a trapezoidal plate section having a front vertical friction surface, a rear surface, and opposite facing bi-converging end faces joining said front and rear surfaces.
8. The wear plate of claim 7 wherein:
   (A) a ledge contained in a horizontal plane extends outwardly from said rear surface.
9. The wear plate of claim 7 wherein:
   (A) said end faces which when viewed in elevation, converge downwardly.
10. The wear plate of claim 7 wherein:
    (A) said end faces which when viewed in plan, converge rearwardly.
11. The wear plate of claim 7 wherein:
    (A) said plate section has a pair of extensions projecting equidistantly away from the front surface adjacent the end faces to form a vertical recess therebetween.
12. The wear plate of claim 11 wherein:
    (A) the outermost ends of the extensions define a pair of vertical coplanar surfaces spaced from said front surface.

References Cited
UNITED STATES PATENTS

| | | |
|---|---|---|
| 2,277,263 | 3/1942 | Tucker. |
| 2,324,267 | 7/1943 | Oelkers. |
| 2,352,693 | 7/1944 | Davidson. |
| 2,422,638 | 6/1947 | Tucker. |

ARTHUR L. LA POINT, *Primary Examiner.*

HOWARD BELTRAN, *Assistant Examiner.*